US010210165B2

(12) United States Patent
Crews

(10) Patent No.: US 10,210,165 B2
(45) Date of Patent: Feb. 19, 2019

(54) FILE MANAGEMENT FOR EDISCOVERY

(71) Applicant: Walmart Apollo, LLC, Bentonville, AR (US)

(72) Inventor: Aaron David Crews, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 199 days.

(21) Appl. No.: 15/251,717

(22) Filed: Aug. 30, 2016

(65) Prior Publication Data

US 2017/0068682 A1 Mar. 9, 2017

Related U.S. Application Data

(60) Provisional application No. 62/214,683, filed on Sep. 4, 2015.

(51) Int. Cl.
G06F 17/30 (2006.01)

(52) U.S. Cl.
CPC .. G06F 17/30091 (2013.01); G06F 17/30011 (2013.01); G06F 17/30082 (2013.01); G06F 17/30221 (2013.01)

(58) Field of Classification Search
None
See application file for complete search history.

(56) References Cited

U.S. PATENT DOCUMENTS

| | | |
|---|---|---|
| 5,560,007 A | 9/1996 | Thai |
| 5,765,173 A * | 6/1998 | Cane ................... G06F 11/1453 707/640 |
| 6,360,215 B1 | 3/2002 | Judd et al. |
| 7,761,427 B2 | 7/2010 | Martin et al. |
| 7,895,163 B2 | 2/2011 | Kim |
| 7,913,053 B1 | 3/2011 | Newland |
| 8,396,838 B2 | 3/2013 | Brockway et al. |
| 8,572,043 B2 | 10/2013 | Pogodin |
| 8,745,155 B2 | 6/2014 | Andersen et al. |
| 9,135,266 B1 | 9/2015 | Makin |
| 9,208,219 B2 | 12/2015 | Sperling et al. |
| 2009/0150168 A1 | 6/2009 | Schmidt |
| 2010/0321183 A1 | 12/2010 | Donovan et al. |
| 2010/0332401 A1 | 12/2010 | Prahlad et al. |

(Continued)

*Primary Examiner* — Son T Hoang

(74) *Attorney, Agent, or Firm* — Patterson Thuente Pedersen, P.A.

(57) ABSTRACT

An ediscovery system filters a document corpus to identify a filtered document set. The filtered document set is further analyzed to identify a production document set. Documents of the document corpus are stored in one of online storage and nearline storage, nearline storage providing slower access times. Documents added to the production set and/or filtered document set are moved to online storage if not already present. A countdown is associated with each document in the online storage and the document is moved to nearline storage on expiration of the counter. For each document moved, a placeholder file is retained in online storage that includes searchable text of the document. Documents in the production set may have a countdown that is longer for documents in the filtered document set. Documents in the filtered document set may have a countdown that is longer than remaining documents in the document corpus.

18 Claims, 3 Drawing Sheets

(56) References Cited

U.S. PATENT DOCUMENTS

| | | |
|---|---|---|
| 2012/0221787 A1 | 8/2012 | Fuente et al. |
| 2013/0262386 A1* | 10/2013 | Kottomtharayil ............................ G06F 17/30174 707/635 |
| 2014/0181045 A1 | 6/2014 | Pawar et al. |
| 2016/0085750 A1* | 3/2016 | Taketa .............. G06F 17/30073 707/737 |

\* cited by examiner

FILE MANAGEMENT FOR EDISCOVERY

CROSS-REFERENCE TO RELATED APPLICATIONS

This application claims the benefit of U.S. Provisional Patent Application 62/214,683, filed Sep. 4, 2015, and titled "File Management for eDiscovery", the entire contents of which are hereby incorporated herein by reference.

BACKGROUND

Field of the Invention

This invention relates to systems and methods for managing file storage in a system performing ediscovery.

Background of the Invention

A major component of any litigation is the discovery process wherein litigants exchange or "produce" relevant documents. In a complex litigation, the number of documents that must be evaluated for relevance and potentially produced is enormous. Likewise, inasmuch as litigation may last for a long time, these documents must be stored in an accessible manner for long periods. Currently, the production of electronic documents may be performed using accepted "ediscovery" practices.

The systems and methods disclosed herein provide an improved approach for managing documents as part of ediscovery.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
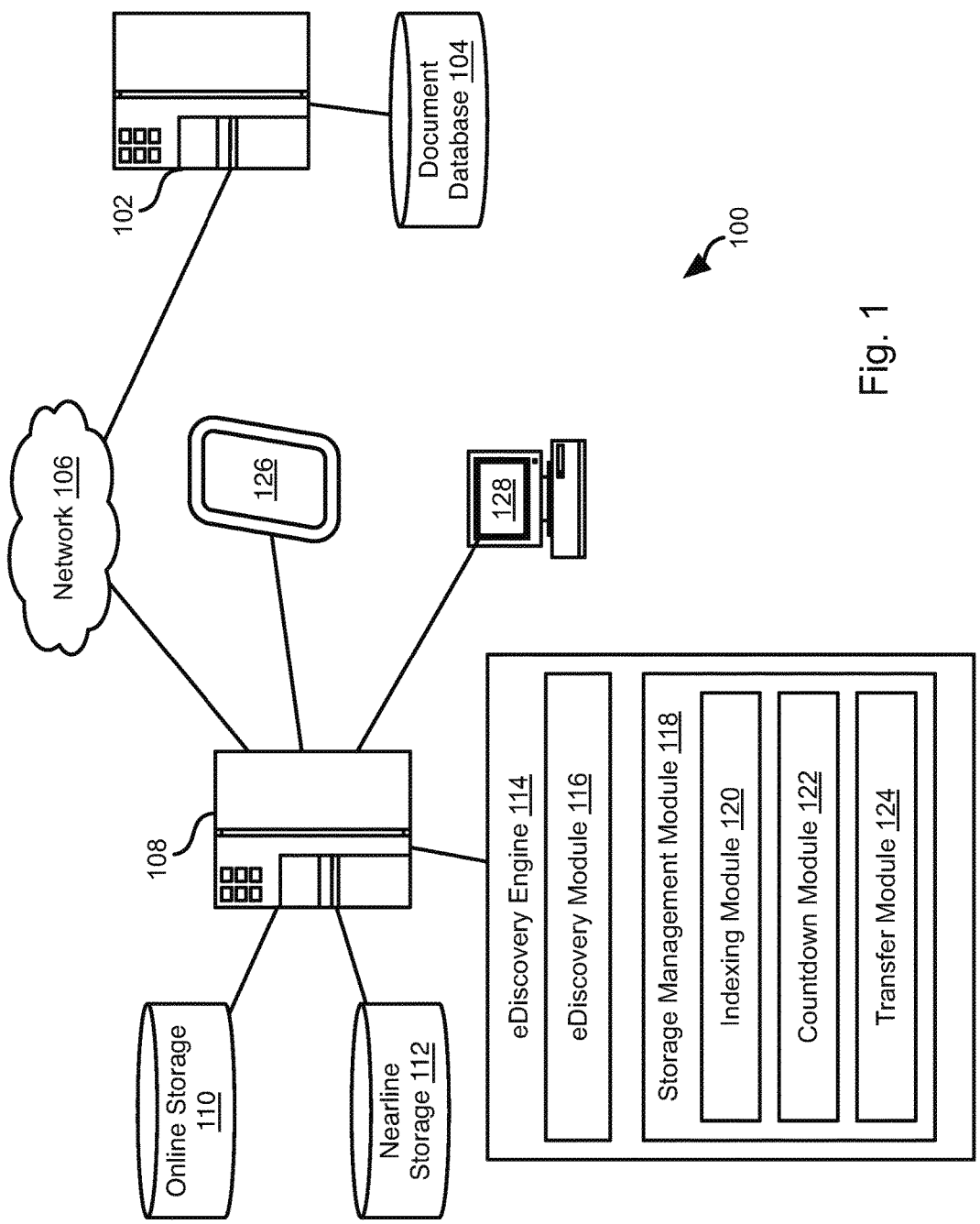
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may be used to implement methods as described herein. The environment 100 may include a server system 102 hosting or accessing a document database 104. The document database 104 may, for example, be a corporate database that stores records for a corporation that are relevant to a litigation, e.g. emails, transaction data, contracts, reports, white papers, engineering models, and any other document or file that may be used by a business or person that may be relevant to a litigation. Although reference is made herein to a server system 102 and database 104, the server system 102 and 104 shall be understood to include any type of computing device and data that may be stored thereon, such as a collection of personal computers, including mobile computers, having hard drives that store documents relevant to a litigation.

The server system 102 may be coupled by a network 106 to another server system 108 that performs an ediscovery process on documents stored in the document database 104. In some embodiments, the server system 102 may also perform the functions ascribed herein to the server system 108. The server system 108 may be embodied as one or more servers or a single computer, including a personal computer.

The network 106 may be embodied as one or more types of networks such as the Internet, local area network (LAN), wide area network (WAN), or any other type of wired or wireless network connection.

The server system 108 may include or access online storage 110 and nearline storage 112. The online storage 110 may provide faster access times than the nearline storage 112. For example, a read or write request to the online storage 110 may be have a latency and/or throughput that is at least 1.5 times faster than the nearline storage 112. In some implementations, the latency and/or throughput of the online storage 110 may be at least 10 times faster than that of the near line storage 112. The online storage 110 may be embodied as a local hard drive coupled to one or more processors of the server system 108 by a system bus, i.e. a PCI, PCIe, SCSI, ATA, SAS, SATA, USB, or some other device connection protocol. The hard drive may be embodied as a NAND flash memory, hard disk drive, or any other form of non-volatile memory.

The nearline storage 112 may likewise be embodied as any type of hard drive including a non-volatile memory. However, the nearline storage 112 may be a less expensive implementation of such a storage device and/or be more remote from the server system 108 than the online storage 110. For example, the nearline storage 112 may be implemented as a hard drive in a different server system such that read and write requests must be routed over a network using TCP/IP protocol rather than a device-to-device connection over a system bus. The nearline storage 112 may be located in a different facilitate separated by hundreds of meters or kilometers. The nearline storage 112 may be hosted by a different entity, e.g. cloud storage accessed over the Internet.

The server system 108 may host an ediscovery engine 114 that processes documents from the document database 104 in order to identify documents to produce in the context of litigation. The ediscovery engine 114 may include an ediscovery module 116 that identifies relevant documents based on filter criteria, analysis algorithms, human selection, or other means. The documents analyzed by the ediscovery module 116 may be stored in one of the online storage 110 and near line storage 112.

The management of the storage of the documents may be performed by a storage management module 118. The storage management module may include an indexing module 120 that analyzes each document and extracts relevant information therefrom, which may include the text contained within a document as well as other metadata describing the each document. The indexing module 120 may create a placeholder file that includes this metadata and text of the document. The placeholder file may reference the document, i.e. include a file name, file system path, or other unique identifier for the document.

The storage management module 118 may include a countdown module 122. As described in greater detail below with respect to FIG. 3, files may be transferred between online and nearline storage 110, 112 based on a countdown associated therewith. Accordingly, the countdown module 122 may manage the countdowns of the files as described below.

The storage management module 118 may include a transfer module 122. The transfer module 124 may transfer files between online and nearline storage 110, 112 in response to expiration of the countdowns thereof or based on other events as described below with respect to FIG. 3.

Users may access the server system 108 in order to invoke processing of the ediscovery engine 114 and to access files identified using the ediscovery engine 114. For example, users may connect to the server system 108 using a tablet computer or mobile phone 126 or using a laptop or desktop personal computer 128.

Figure 2:
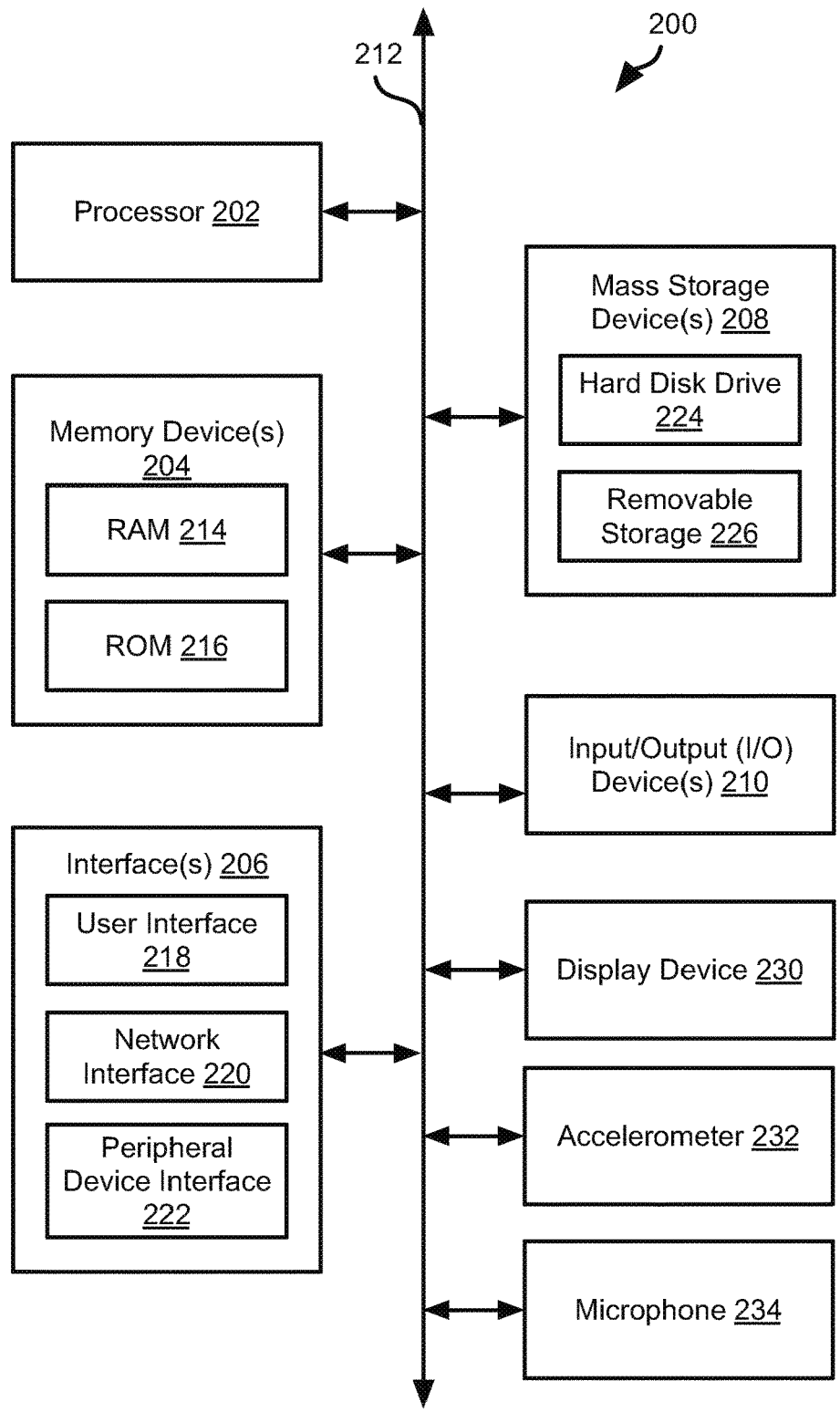
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The server systems 102, 108 and personal computers 126, 128 may have some or all of the attributes of the computing device 200. Computing device 200 can function as a server, a client, or any other computing entity. Computing device 200 can be any of a wide variety of computing devices, such as a desktop computer, a notebook computer, a server computer, a handheld computer, a tablet computer and the like. A server system 102, 108 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

A computing device 200 implementing the user computers 108 may advantageously include one or more sensors. The output of these sensors may be used to determine whether a media file is viewed solely for inspiration or viewed during execution of a meal that the media file instructs how to prepare. In some embodiments, the sensors include an accelerometer 232 that detects acceleration of the user computer 108 in which it is included as well as the orientation thereof. In some embodiments, the sensors further include a microphone 234 capable of detecting sounds incident on the user computer 108.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
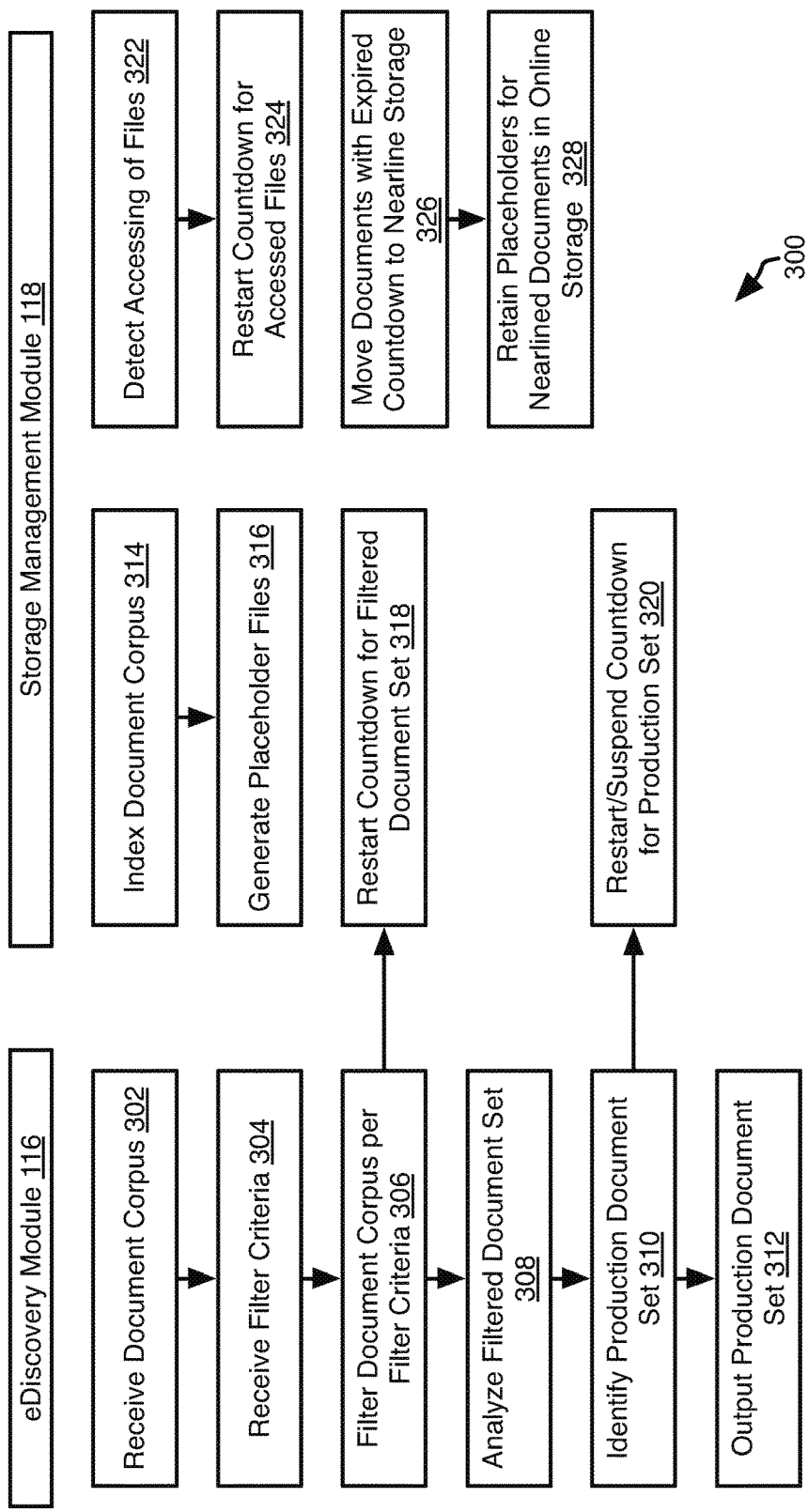
FIG. 3 is a process flow diagram of a method for managing files during ediscovery in accordance with an embodiment of the present invention.

Referring to FIG. 3, the illustrated method 300 may be executed by the server system 108, e.g. by the ediscovery engine 114 executing on the server system 108. The method 300 may include receiving 302 a document corpus, such as from a different server system 102 or database or from a storage device coupled to the server system 108.

The method 300 may include receiving 304 filter criteria and filtering 306 the document corpus according to the filter criteria. The filter criteria maybe input by a user, such as a user accessing the server system 108 from a personal computing device 126, 128. Filtering 306 may identify a filtered document set from the document corpus, where the documents of the filtered document set satisfy the filter criteria. The filter criteria may include any data that describes a document, such as keywords, co-occurrence of keywords, proximity of keywords to one another, a phrase, concepts referenced by text of a document as determined by natural language processing, or any other attribute of the document or text within the document.

The filtered document set may be further analyzed 308 and based on the analysis a production document set may be identified 310. The analysis 308 may be performed according to human judgment or using a computer algorithm. In particular, the analysis 308 may include analyzing documents of the filtered document set to determine their relevance to a subject of the litigation, i.e. the parties, technology, transaction, policy, or the like that is at issue in the litigation. Analyzing 308 may include any type of subject matter analysis known in the art that is capable of taking free-form text and determining concepts referred to using natural language processing. For example, analyzing 308 may include analyzing not just words used in the document, but also the meaning and context in which words were used.

Those documents determined from the analyzing steps 308 to be relevant to the subject matter of the litigation may be identified 310 as the production set and output 312. Outputting 312 the production set may include transmitting the files to a user device 126, 128 or transmitting a listing of the files to a user device 126, 128. Outputting 312 may simply include making available a document, such as a web page, that references the documents of the production set, e.g. with links to the documents of the production set. Outputting 312 may include creating a directory including the documents of the production set or links to the documents of the document set.

The storage management module 118 may perform some or all of the illustrated functions concurrently or interleaved with performance of the steps 302-312 performed by the ediscovery module 116. Some or all of the functions attributed to the storage management module 118 may also be performed before and/or after performance of the steps 302-312.

For example, the method 300 may include indexing 314 the document corpus and generating 316 a placeholder file for each document of the document corpus. Indexing 314 a document of the document corpus may include extracting text from the native file format of the document, identifying words used in the text, and identifying metadata for the document (e.g. an author). The placeholder file for the document may include some or all of the text of the document, an index of terms in the document, and the metadata of the document. The placeholder file may be linked to the document for which it is a placeholder, such as by means of a reference stored in the placeholder file or by naming the placeholder file in such a way that it can be mapped to the file name of the document for which it is a placeholder. The placeholder file may advantageously be much smaller than the native document it represents. In particular, the placeholder file may include text of a document but omit formatting and other metadata of the native file format of the document that is not relevant to the human generated content of the document.

Each document of the document corpus may have a last-accessed value associated therewith that indicates that last time the document was "touched," i.e. opened, read, written to, moved, etc. As discussed below, documents of the document corpus may be moved between the online and nearline storage 110, 112 based on the last-accessed value. The last-accessed value of each document in the document corpus may initiate to the last-accessed value of that document as stored in the document database 104 from which the document was obtained. Each document of the document corpus may have a countdown associated therewith. The countdown may be decremented with the passage of time, e.g. decremented every hour, day, week, or upon passage of some other time interval. When a countdown of a document in online storage 110 reaches zero, the document may be moved to nearline storage 112. The countdown for a document may be an actual value that is decremented or may be obtained from a difference between a current date or time and the last-accessed value.

In some embodiments, documents identified at step 306 as the filtered document set may be touched at step 318 in order to restart the countdown for the documents. Restarting 318 the countdown for a document selected for inclusion in the filtered document set may include one or both of setting the last-accessed value of the document to the current date (i.e. the date on which it was added to the filtered document set or on which step 318 is executed) and setting a countdown value for the document to P, where P is a predetermined value that may be a number of days, hours, weeks, etc.

In a similar manner, countdowns may be restarted 320 for documents identified at step 310 as belonging to the production document set. This may include one or both of setting the last-accessed value to the current date (i.e. the date on which it was added to the filtered document set or on which step 320 is executed) and setting a countdown value for the document to M, where M is a predetermined value that may be a number of days, hours, weeks, etc. In some embodiments, M is different from P.

In some embodiments, the countdowns for documents identified 310 as belonging to the production document set may be suspended, i.e., the countdowns for the production document set never expire such that they are not moved to nearline storage 112 based on expiration of a time period. In still other embodiments, documents identified 310 as belonging to the production document set are not transferred from online storage 110 to nearline storage 112 and, if not already stored in online storage 110, are moved to online storage 110 ins response to being identified 310 as part of the production document set.

The method 300 may further include detecting 322 accessing of files of the document corpus, and, in response, restarting 324 the countdown for the file accessed. In particular, the last-accessed value of the file accessed may be set to the current date, i.e. the date on which the file was accessed. Additionally or alternatively, a countdown value for the file may be set to N, where N is a predetermined value that may be a number days, hours, weeks, etc.

The value of N may be less than M or P and the value of P may be less than M. Inasmuch as the documents of the product set are more relevant than the remainder of the document corpus, M may be much greater than N, such as at least two times, preferably more than ten times, and more preferably more than twenty times, the value of N. P may be an intermediate value between N and M. In some embodiments, P may be greater than 1.5 times, preferably greater than five times, and more preferably ten times, N.

In this manner, documents of the production set will be more persistently stored in online storage 110. Likewise, documents of the filtered document set that are not included in the production set are more relevant than the remaining documents of the document corpus and therefore will be more persistently stored in online storage 110, though less persistently then the documents of the production set.

The method 300 may further include the storage management module 118 periodically moving 326 documents with expired countdowns from online storage 110 to nearline storage 112. For example, a script may be executed by the server system 108 daily, hourly, or at some other interval that evaluates the countdowns of documents of the document corpus stored in online storage 110 and moves those with expired countdowns to the nearline storage 112. As noted above, a document may have an actual countdown value stored in association therewith. Alternatively, the storage management module 118 may compare a last-accessed value to the date of execution of the script. Where the difference exceeds M for a document of the production set, P for a document of the filtered set not in the production set, or N for any other document of the document corpus, then the document will be moved to nearline storage 112.

The method 300 may further include retaining 328 placeholders for documents moved 326 to nearline storage 112. For example, each document in online storage may be stored with its placeholder file, either as a data object including both the document and its placeholder file or by including them both in the same folder in a file system.

When a document is moved 326 to nearline storage 112, the placeholder file may be retained in the online 110. In this manner, the text of the document is still available for performing searches, e.g. per steps 306 and 308, but is not occupying the more valuable storage space.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:
1. A method comprising:
  receiving, by a computer system, a first document set from a first database, each document of the first document set having a last-accessed value;
  storing, by the computer system, the first document set in a fast storage medium;
  receiving, by the computer system, one or more filter criteria;
  (a) selecting, by the computer system, a second document set from the first document set, each document of the second document set satisfying the one or more filter criteria;
  (b) selecting, by the computer system and in response to a received selection instruction, a third document set from the second document set;
  (c) outputting, by the computer system, a listing of the third document set;
  transferring, by the computer system, a first portion of the first document set to a slow storage medium, the fast storage medium having an access time greater than an access time of the slow storage medium, each document in the first portion having a last-accessed value of more than N days prior to a current date, the first portion excluding the third document set;
  transferring, by the computer system a second portion of the first document set to the slow storage medium, each document in the second portion being in the third document set and having a last-accessed value of more than M days prior to the current date, wherein M is greater than N; and transferring, by the computer system, a third portion of the first document set to the slow storage medium, each document in the third portion being in the second document set and not in the third document set, and each document in the third portion having a last-accessed value more than P days prior to the current date, wherein P is greater than N and less than M.

2. The method of claim 1, further comprising:
transferring, by the computer system, a fourth portion of the first document set from the slow storage medium to the fast storage medium in response to a document being selected in at least one of (a), (b), or (c).

3. The method of claim 2, further comprising:
transferring, by the computer system, a filth portion of the first document set from the slow storage medium to the fast storage medium in response to a document being accessed by a user.

4. The method of claim 1, wherein M is at least two times N and P is at least 1.5 times N.

5. The method of claim 1, further comprising refraining from transferring documents in the third document set to the slow storage medium regardless of a number of days between corresponding last-accessed values of documents in the third document set and the current date.

6. The method of claim 1, further comprising:
indexing the first document set;
generating, for each document of the first document set, a placeholder file, the placeholder file including at least a portion of textual content of each indexed document in the first document set.

7. The method of claim 6, wherein the transferring the first portion of the first document set to the slow storage medium further comprises retaining in the fast storage medium the placeholder file for each document of the first portion.

8. The method of claim 7, wherein the selecting the third document set from the second document set comprises analyzing corresponding placeholder files of documents in the second document set.

9. The method of claim 8, wherein the placeholder file for each document in the first document set includes all textual content of each document.

10. A system comprising:
a slow storage medium;
a fast storage medium, the last storage medium having faster access time than the slow storage medium;
a computer system comprising one or more processing devices and one or more memory devices operably coupled to the one or more processing devices, the one or more memory devices storing executable code effective to cause the one or more processing devices to:
receive a first document set, each document of the first document set having a last-accessed value;
receive one or more filter criteria;
(a) select a second document set from the first document set, each document of the second document set satisfying the one or more filter criteria;
(b) at least one of select and receive a selection of a third document set from the second document set;
(c) output a listing of the third document set;
transfer first documents, second documents, and third documents in the first document set to the slow storage medium;
each of the first documents having the last-accessed value of more than N days before a current date and not being in the third document set;
each of the second documents being in the third document set and having the last-accessed value of more than M days before the current date, wherein M is greater than N; and
each of the third documents being in the second document set and not in the third document set and having the last accessed value of more than P days before the current date, wherein P is greater than N and less than M.

11. The system of claim 10, wherein the executable code is further effective to cause the one or more processing devices to:
for the second documents in the first document set that are stored in the slow storage medium and have been selected in at least one of (a), (b), or (c), updating the last-accessed values of the second documents to the current date and transferring the second documents to the fast storage medium.

12. The system of claim 10, wherein the executable code is further effective to cause the one or more processing devices to:
detect attempts to access the third documents in the first document set;
in response to detecting the attempts to access the third documents in the first document set, moving the third documents to the fast storage medium if not currently stored in the fast storage medium and updating the last-accessed values of the third documents to dates of the attempts to access the third documents.

13. The system of claim 10, wherein M is at least two times N and P is at least 1.5 times N.

14. The system of claim 10, wherein the executable code is further effective to cause the one or more processing devices to:
refrain from transferring documents in the third document set to the slow storage medium regardless of a difference between the last-accessed values of the documents in the third document set and the current date.

15. The system of claim 10, wherein the executable code is further effective to cause the one or more processing devices to:
index the first document set;
generate, for each document of the first document set, a placeholder file, the placeholder file including at least a portion of textual content of each indexed document in the first document set.

16. The system of claim 15, wherein the executable code is further effective to cause the one or more processing devices to:
retain in the fast storage medium the placeholder file for each of the first documents.

17. The system of claim 16, wherein the executable code is further effective to cause the one or more processing devices to:
select the third document set from the second document set by analyzing corresponding placeholder files of documents in the second document set.

18. The system of claim 17, wherein the placeholder file for each document in the first document set includes all textual content of each document.

* * * * *